(12) United States Patent
Hanson

(10) Patent No.: US 10,484,028 B2
(45) Date of Patent: Nov. 19, 2019

(54) SQUELCH SUB-SYSTEM USING CORRELATION BETWEEN UPLINK PATHS

(71) Applicant: CommScope Technologies LLC, Hickory, NC (US)

(72) Inventor: Van E. Hanson, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/566,599

(22) PCT Filed: Apr. 15, 2016

(86) PCT No.: PCT/US2016/027809
§ 371 (c)(1),
(2) Date: Oct. 13, 2017

(87) PCT Pub. No.: WO2016/168639
PCT Pub. Date: Oct. 20, 2016

(65) Prior Publication Data
US 2018/0097532 A1  Apr. 5, 2018

Related U.S. Application Data

(60) Provisional application No. 62/147,886, filed on Apr. 15, 2015.

(51) Int. Cl.
*H04B 1/10* (2006.01)
*H04B 1/16* (2006.01)
(Continued)

(52) U.S. Cl.
CPC .......... *H04B 1/10* (2013.01); *H04B 1/16* (2013.01); *H04B 1/18* (2013.01); *H04B 7/15535* (2013.01);
(Continued)

(58) Field of Classification Search
CPC .......... H04B 1/10; H04B 17/21; H04B 1/16; H04W 52/245; H04W 52/52
See application file for complete search history.

(56) References Cited

U.S. PATENT DOCUMENTS

| 7,116,942 B2 | 10/2006 | Hasegawa | |
|---|---|---|---|
| 2004/0002323 A1* | 1/2004 | Zheng | H03D 3/009 455/324 |

(Continued)

FOREIGN PATENT DOCUMENTS

| EP | 0785632 A2 | 7/1997 |
|---|---|---|
| JP | 2000299679 A | 10/2000 |

(Continued)

OTHER PUBLICATIONS

International Searching Authority (IB), "International Preliminary Report on Patentability for PCT Application No. PCT/US2016/027809", "Foreign Counterpart to U.S. Appl. No. 15/566,599", dated Oct. 26, 2017, pp. 1-8, Published in: U.S.

(Continued)

*Primary Examiner* — Janice N Tieu
(74) *Attorney, Agent, or Firm* — Fogg & Powers LLC

(57) ABSTRACT

One embodiment is directed to a system comprising a first signal path configured to receive a first uplink signal and a second signal path configured to receive a second uplink signal. The system further comprises a correlator communicatively coupled to the first signal path and the second signal path and configured to produce correlation data indicative of any correlation between the first uplink signal and the second uplink signal. The system further comprises a comparator communicatively coupled to the correlator and configured to cause, based on receiving the correlation data, a first variable gain device in the first signal path to adjust a gain of the first uplink signal and a second variable gain (Continued)

device in the second signal path to adjust a gain of the second uplink signal. Other embodiments are disclosed.

25 Claims, 6 Drawing Sheets

(51) Int. Cl.
*H04B 17/21* (2015.01)
*H04W 52/24* (2009.01)
*H04W 52/52* (2009.01)
*H04B 1/18* (2006.01)
*H04B 7/155* (2006.01)
*H04B 17/00* (2015.01)
*H04B 17/309* (2015.01)
*H04W 88/08* (2009.01)

(52) U.S. Cl.
CPC ......... *H04B 17/0087* (2013.01); *H04B 17/21* (2015.01); *H04B 17/309* (2015.01); *H04W 52/245* (2013.01); *H04W 52/52* (2013.01); *H04W 88/085* (2013.01)

(56) References Cited

U.S. PATENT DOCUMENTS

| | | | |
|---|---|---|---|
| 2010/0118917 A1 | 5/2010 | Oh et al. | |
| 2010/0159844 A1* | 6/2010 | Yamazaki | H01Q 3/2605 455/69 |
| 2012/0281565 A1* | 11/2012 | Sauer | H04W 64/00 370/252 |
| 2014/0072064 A1* | 3/2014 | Lemson | H04B 10/25753 375/267 |
| 2014/0133411 A1* | 5/2014 | Park | H04L 5/0058 370/329 |

FOREIGN PATENT DOCUMENTS

| | | |
|---|---|---|
| JP | 2013197755 A | 9/2013 |
| KR | 1020100054072 A | 5/2010 |
| WO | 2011156465 A1 | 12/2011 |
| WO | 2014040608 A1 | 3/2014 |

OTHER PUBLICATIONS

International Searching Authority, "International Search Report and Written Opinion for PCT Application No. PCT/US2016/027809", Foreign Counterpart to U.S. Appl. No. 15/566,599, dated Jul. 28, 2016, pp. 1-11, Published in: U.S.
European Patent Office, "Extended EP Search Report from EP Application No. 16780862.5 dated Nov. 22, 2018"; From Foreign Counterpart of U.S. Appl. No. 15/566,599; pp. 1-8; Published in EP.
State Intellectual Property Office, P.R. China, "First Office Action from CN Application No. 201680017944.7 dated Feb. 2, 2019", from Foreign Counterpart to U.S. Appl. No. 15/566,599, Feb. 2, 2019, pp. 1-16, Published: CN.
State Intellectual Property Office, P.R. China, "Rejection Decision from CN Application No. 201680017944.7 dated Jul. 1, 2019", from Foreign Counterpart to U.S. Appl. No. 15/566,599, pp. 1-13, Published: CN.

\* cited by examiner

SQUELCH SUB-SYSTEM USING CORRELATION BETWEEN UPLINK PATHS

CROSS-REFERENCE TO RELATED APPLICATIONS

This application is a U.S. National Stage application of PCT Application Serial No. PCT/US2016/027809, filed 15 Apr. 2016 and titled "SQUELCH SUB-SYSTEM USING CORRELATION BETWEEN UPLINK PATHS," which claims the benefit of U.S. Provisional Application Ser. No. 62/147,886, filed 15 Apr. 2015 and titled "SQUELCH SUB-SYSTEM USING CORRELATION BETWEEN UPLINK PATHS," the contents of all of which are incorporated herein by reference

BACKGROUND

The present disclosure relates to improved systems and methods for controlling the gain of a variable gain device using a squelch sub-system that selectively performs a squelch function based on determining whether uplink signals in different signal paths are correlated with one another.

SUMMARY

One embodiment is directed to a system comprising a first signal path configured to receive a first uplink signal and a second signal path configured to receive a second uplink signal. The system further comprises a correlator communicatively coupled to the first signal path and the second signal path and configured to produce correlation data indicative of any correlation between the first uplink signal and the second uplink signal. The system further comprises a comparator communicatively coupled to the correlator and configured to cause, based on receiving the correlation data, a first variable gain device in the first signal path to adjust a gain of the first uplink signal and a second variable gain device in the second signal path to adjust a gain of the second uplink signal.

Another embodiment is directed to a method comprising receiving a first uplink signal in a first signal path, receiving a second uplink signal in a second signal path, producing correlation data indicative of any correlation between the first uplink signal and the second uplink signal, and causing, based at least in part on the correlation data, a first variable gain device in the first signal path to adjust a gain of the first uplink signal and a second variable gain device in the second signal path to adjust a gain of the second uplink signal.

Another embodiment is directed to a distributed antenna system. The distributed antenna system comprises at least one master unit and a plurality of remote units. Each of the plurality of remote units is associated with a respective one or more antennas. Each of the remote units is communicatively coupled to the master unit. The distributed antenna system comprises, for each remote unit, a respective first signal path configured to receive a respective first uplink signal and a respective second signal path configured to receive a respective second uplink signal. The distributed antenna system further comprises, for each remote unit, a respective correlator communicatively coupled to the respective first signal path and the respective second signal path and configured to produce respective correlation data indicative of any correlation between the respective first uplink signal and the respective second uplink signal. The distributed antenna system further comprises, for each remote unit, a respective comparator communicatively coupled to the respective correlator and configured to cause, based on receiving the respective correlation data, a respective first variable gain device in the respective first signal path to adjust a gain of the respective first uplink signal and a respective second variable gain device in the respective second signal path to adjust a gain of the respective second uplink signal.

DRAWINGS

DETAILED DESCRIPTION

Squelch circuits or other squelch sub-systems may be used in a distributed antenna system ("DAS") or other telecommunication system to selectively mute or otherwise attenuate signals traversing a signal path. For example, a DAS remote unit may receive a signal that has a signal power below a threshold, such as noise from an open receiver. In the absence of a squelching function, the noise may be transmitted back to a base station. Transmitting the noise to the base station can desensitize the receiver of the base station. Muting or otherwise attenuating the received signal of the remote unit can reduce or prevent unnecessary desensitization of a serving base station.

A squelch circuit may be used in a DAS. For example, multiple remote units of a DAS can receive multiple uplink signals from one or more mobile stations (e.g., mobile phones or other terminal devices). The received uplink signals can be summed together or otherwise combined by a head-end unit, master unit, or other suitable unit of the DAS that is communicatively coupled to the remote units. The head-end unit can provide the combined signal to a base station. A signal from an uplink receiver of a remote unit may be omitted from the combined uplink signals, collectively, when there are no mobile station signals present in a particular uplink receiver.

Figure 1:
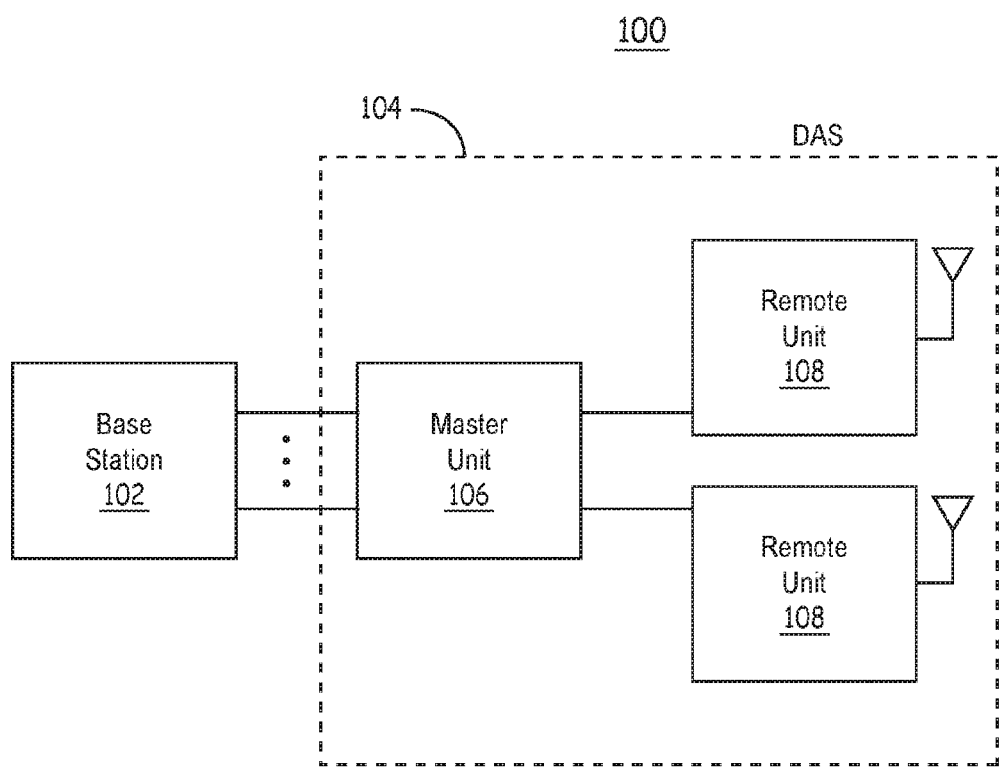
FIG. 1 shows an example of a telecommunications system that may be used for implementing an aspect of the present disclosure.

FIG. 1 shows an example of a telecommunications system 100 that may be used for implementing an aspect of the present disclosure.

The telecommunications system 100 may include a base station 102 communicatively coupled to a DAS 104 via a master unit or other head-end unit 106 in the DAS 104. The DAS 104 includes the master unit 106 and multiple remote units 108 communicatively coupled to the master unit 106. For illustrative purposes, one master unit 106 and two remote units 108 are depicted in FIG. 1. However, any number of master units 106 and remote units 108 may be included in a DAS 104.

In some aspects, the master unit 106 can be a head-end unit or other suitable unit 106 that can communicate with one or more base stations 102 or other transceiver devices in communication with the DAS 104. A head-end unit 106 may include, for example, an optical transceiver that transmits optical signals to, and receives optical signals from, the remote units 108. The head-end unit or other suitable unit 106 can communicate with remote units 108 in different coverage zones of the same DAS 104.

The DAS 104 can communicate signals to and from mobile stations or other terminal devices via the master unit 106 and the remote units 108 that service one or more coverage zones. The master unit 106 may be communicatively coupled with the base station 102 and the remote units 108 in any suitable manner. Communicatively coupling devices in a DAS 104 or other telecommunication system may involve establishing, maintaining, or otherwise using a communication link (e.g., a cable, an optical fiber, a wireless link, etc.) to communicate information between the devices. Any suitable types of communication links can be used in the DAS 104. A suitable communication link can be a wired connection or a wireless connection. Types of wired connections may include, for example, a connection via a copper cable, an optical fiber, or another suitable communication medium. Types of wireless connections may include, for example, a wireless radio frequency ("RF") communication link or a microwave link. The type of communication link between the base station 102 and the master unit 106 may be the same as or different from the type of communication link between the master unit 106 and the remote units 108.

The master unit 106 may provide downlink signals from the base station 102 to the remote units 108 and receive uplink signals from the remote units 108 to be provided to the base station 102. Downlink signals may include signals provided from the base station 102 and transmitted by the remote units 108 in coverage zones. Uplink signals can include signals transmitted by mobile stations or other terminal devices and received by the remote units 108. The downlink and uplink signals may include multi-input and multi-output ("MIMO") signals.

The remote units 108 can provide signal coverage in one or more coverage zones. Providing signal coverage in the coverage zones can include wirelessly transmitting downlink signals received from the master unit 106 to mobile stations or other terminal devices in the coverage zones. Providing signal coverage in the coverage zones can also include wirelessly receiving uplink signals from the mobile communication devices or other mobile stations or other terminal devices in the coverage zones. The remote units 108 can transmit the uplink signals to the master unit 106. The master unit 106 can transmit the uplink signals to the base station 102.

Although FIG. 1 depicts direct links between the master unit 106 and the remote units 108, other implementations are possible. In some aspects, the master unit 106 can be communicatively coupled to the remote units 108 via one or more extension units or other intermediate devices.

The master unit 106 can combine uplink transmissions received from some or all of the remote units 108 into a combined uplink signal, such as a composite signal. A transmitter of the master unit 106 can transmit the combined uplink signal to an uplink receiver of the base station 102. In some aspects, the master unit 106 may use a processing module to combine uplink transmissions received from the remote units 108. The processing module can include one or more devices configured to select uplink signals for combination, programming instructions executable by a processor to select uplink signals for combination, or any suitable combination thereof.

Figure 2:
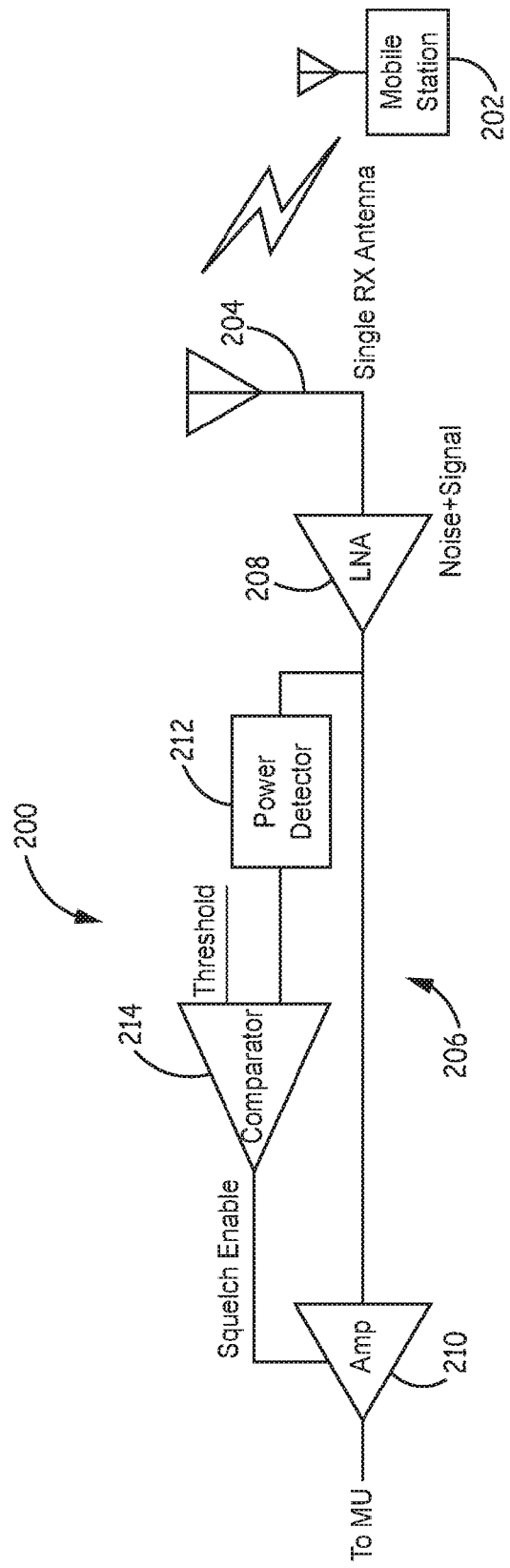
FIG. 2 shows an example of a squelch circuit of a telecommunication system that communicates with a mobile station.

FIG. 2 shows an example of a squelch circuit 200 of a telecommunication system that communicates with a mobile station 202.

The antenna 204 depicted in FIG. 2 is communicatively coupled to a signal path 206 that includes a low-noise amplifier 208 and a variable gain device 210 (e.g., a variable gain amplifier, labeled "Amp" in FIG. 2). The gain of the variable gain device 210 may be controlled by a squelch circuit 200. The squelch circuit 200 includes a power detector 212 and a comparator 214. The input of the power detector 212 is coupled to the signal path 206. The output of the power detector 212 is communicatively coupled to an input of the comparator 214.

An uplink signal received via the antenna 204 may be amplified by the low-noise amplifier 208. The amplified uplink signal may be received by the subsequent variable gain device 210. The power detector 212 may output the power level to the comparator 214. The comparator 214 compares the power level to a threshold power level. An output of the comparator 214 can control the operation of the variable gain device 210. If the output of the comparator 214 indicates that the power level of the uplink signal is below the threshold power level, the gain of the variable gain device 210 may be set to zero or another suitable value for muting or otherwise attenuating the uplink signal. If the output of the comparator 214 indicates that the power level of the uplink signal is at or above the threshold power level, the gain of the variable gain device 210 may be set to or maintained at a standard value (e.g., a gain value that does not mute or otherwise attenuate the uplink signal).

The threshold power level may be set to a value that minimizes false detects and missed true detects. False detects can include noise being detected as an uplink signal from a mobile station 202. Missed true detects can include an uplink signal that is not distinguished from noise (e.g., an uplink signal having a power level near the noise floor). A squelch circuit 200 may not distinguish a mobile station signal from noise and not allow the mobile station signal to be amplified. For example, in code division multiple access ("CDMA") systems, uplink signals may have signal levels that are close to the noise floor. Using signal levels that are close to the noise floor can decrease the transmit power used by the mobile station 202 to transmit uplink signals.

An improved system and method may allow noise and mobile station signals to be better differentiated. Specifically, a correlator may be used in a squelch circuit to detect the presence of an uplink signal that may have a low signal power. Using a correlator, the effects of noise may be reduced, allowing a better, more reliable, detector of mobile station signals to be implemented.

Figure 3:
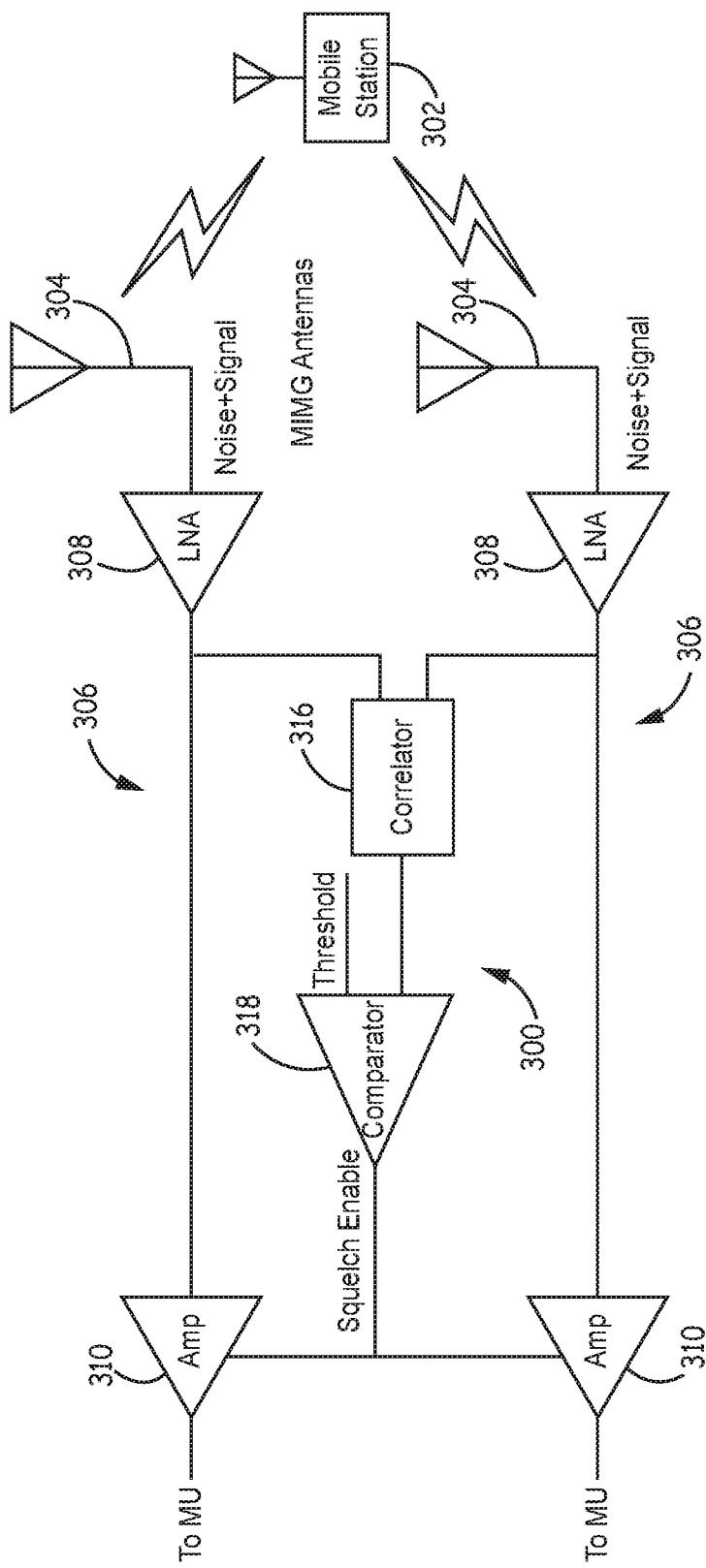
FIG. 3 shows a modified squelch sub-system that can use correlation to detect low-power uplink signals according to one aspect.

FIG. 3 shows a modified squelch sub-system 300 that can use correlation to detect low-power uplink signals according to one aspect. As depicted in FIG. 3, the squelch sub-system 300 can include two antennas 304 that can be used to receive uplink signals transmitted from mobile stations or other terminal devices 302. In some aspects, the two antennas 304 can be included in or communicatively coupled to two remote units, respectively. In additional or alternative aspects, the two antennas 304 can be included in or communicatively coupled to the same remote unit. (Although two antennas 304 are depicted for illustrative purposes, more than two antennas may be used.) Each antenna 304 is communicatively coupled to a respective uplink signal path 306. Each uplink signal path 306 can include a low-noise amplifier 308 and a variable gain device 310 (labeled "Amp" in FIG. 3).

The squelch sub-system 300 may include a correlator 316 and a comparator 318. In some aspects, the correlator 316 and comparator 318 may be separate devices in a circuit. In other aspects, the functions of one or both the correlator 316 and comparator 318 may be performed by software executable on a processor. The correlator 316 can be communicatively coupled to the comparator 318 such that an output signal or data from the correlator 316 is provided to an input of the comparator 318. The comparator 318 can be communicatively coupled to variable gain devices 310 such that an output signal or data from the comparator 318 can control the gain applied by the variable gain devices 310.

The correlator 316 can determine whether signals traversing the two signal paths 306 are correlated with one another. For example, the correlator 316 may use a correlation window to receive multiple samples of each signal traversing a respective signal path 306. In some aspects, the correlation window may be programmable to allow for the number of samples of the signal in each signal path 306 received by the correlator 316 to be adjusted by an operator. The operator may include, but is not limited to, the installer of the squelch sub-system 300, the telecommunications provider, or the provider of components of a DAS. A correlation between the signals can be determined from the product of conjugated samples of the signal in one signal path 306 and the samples of the signal in the other signal path 306. If the signal traversing one or more of the signal paths 306 includes noise, the correlator 316 can be used to determine that the noise in one signal path 306 is uncorrelated with a signal or noise in the other signal path 306. The correlator 316 may output a low-power signal (e.g., below the threshold power level) or other correlation data indicating an absence of correlation. If the correlator 316 determines a correlation between signals traversing the two signal paths 306, the correlator 316 may output a high-power signal (e.g., at or above the threshold power level) or other correlation data indicating the correlation. A correlation can indicate that uplink signals received from a mobile station 302 are traversing both paths 306.

The correlation data outputted by the correlator 316 may be provided to the comparator 318. The comparator 318 may compare the output of the correlator 316 to a threshold power level or other reference data to determine whether to activate a squelch function. Activating a squelch function may include configuring one or more of the variable gain devices 310 with a gain value of zero or another gain value suitable for muting or attenuating uplink signals. If the squelch function is not activated, the gains of the variable gain devices 310 can be set to or maintained at a value that allows the signals in the signals paths 304 to be provided to a combiner (e.g., in a master unit). For example, the squelch function can be activated based on the correlator 316 detecting the absence of a correlation between signals traversing the uplink signal paths 306 (e.g., when only noise is present in one or more of the uplink signal paths 306). The squelch function can be deactivated based on the correlator 316 detecting a correlation between signals traversing the uplink signal paths 306 (e.g., when signals from a mobile station 302 are traversing one or more of the uplink signal paths 306). In some aspects, the correlator 316 in the squelch sub-system 300 may be programmable. For example the correlation window may be adjusted to change the number of samples of a signal in the signal 306 path are used for the correlation.

In some aspects, the squelch sub-system 300 may be integrated into, included in, or communicatively coupled to a remote unit. In other aspects, the squelch sub-system 300 may be integrated into, included in, or communicatively coupled to other devices in the DAS (e.g., the master unit). In other aspects, components of the squelch sub-system 300 may be distributed among different devices of the DAS. For example, the low-noise amplifiers 308 may be in separate remote units and the correlator 316 may be in a master unit or an extension unit.

Figure 4:
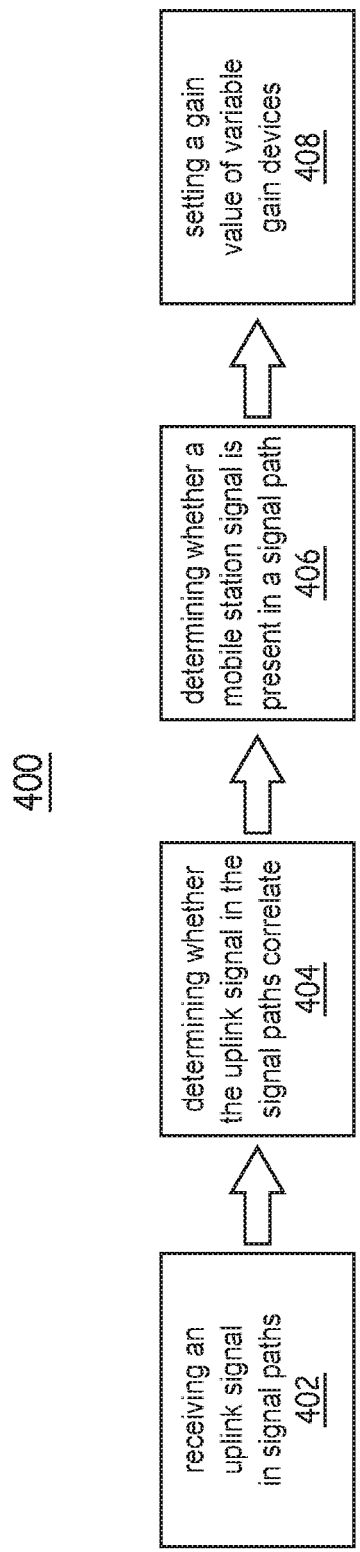
FIG. 4 is a flowchart illustrating a method for selectively activating a squelch function based on determining correlations between two uplink paths according to one aspect.

FIG. 4 is a flowchart illustrating a method 400 for selectively activating a squelch function based on determining correlations between two uplink paths according to one aspect. In the first block 402, uplink signals are received in two or more signal paths. The signals may be received via two or more antennas corresponding to the two or more signal paths. In some aspects, the antennas may be located at a single remote unit or other access point. In other aspects, the antennas may be located at different remote units or other access points. In the second block 404, it is determined whether the uplink signals in each of the signal paths are correlated. A correlator may be used to make this determination. In some aspects, the correlator may be a component or other device in a squelch sub-system. In other aspects, the correlator may be implemented as software executable on a processor. The correlator may perform a correlation function on the uplink signals in each signal path as described above with respect to FIG. 3 to produce correlation data. For example, where two signal paths are present, the correlation of the signals may be the product of conjugated samples of the signal in one signal path and samples of the signal in the other signal path.

In the third block 406, it is determined whether a signal from a mobile station is present in one or more of the signal paths. This determination may be performed by a comparator. In some aspects, the comparator may be a component or other device in the squelch sub-system. In other aspects, the comparator may be implemented as software executable on a processor. The comparator may determine whether a mobile signal is present in one of the signal paths by comparing the correlation data produced by the comparator to a threshold power level. For example, the correlation data being above the threshold power level can cause the comparator to set the gain value of a variable gain device (e.g. a variable gain amplifier) in a signal path to refrain from muting the signals in the signal path, and the correlation data being below the threshold power level can cause the comparator to set the gain value of the variable gain device to a value that mutes or otherwise attenuates the signals in the signal path. In the fourth block 408, the gain value of the variable gain devices in the signal paths is set. The gain value of the variable gain devices may be set to zero or another suitable value for muting or otherwise attenuating the uplink signal when a comparison of the correlation data and the threshold power level indicates that no mobile station signal is present in the signal paths (e.g., when the correlation data is below the threshold power level). The gain value of the variable gain devices may be set to or maintained at a standard value (e.g., a gain value that does not mute or otherwise attenuate the uplink signal) when the comparison of the correlation data and the threshold power level indicates that a mobile station signal is present in at least one of the signal paths (e.g., when the correlation data is at or above a certain threshold).

Figure 5:
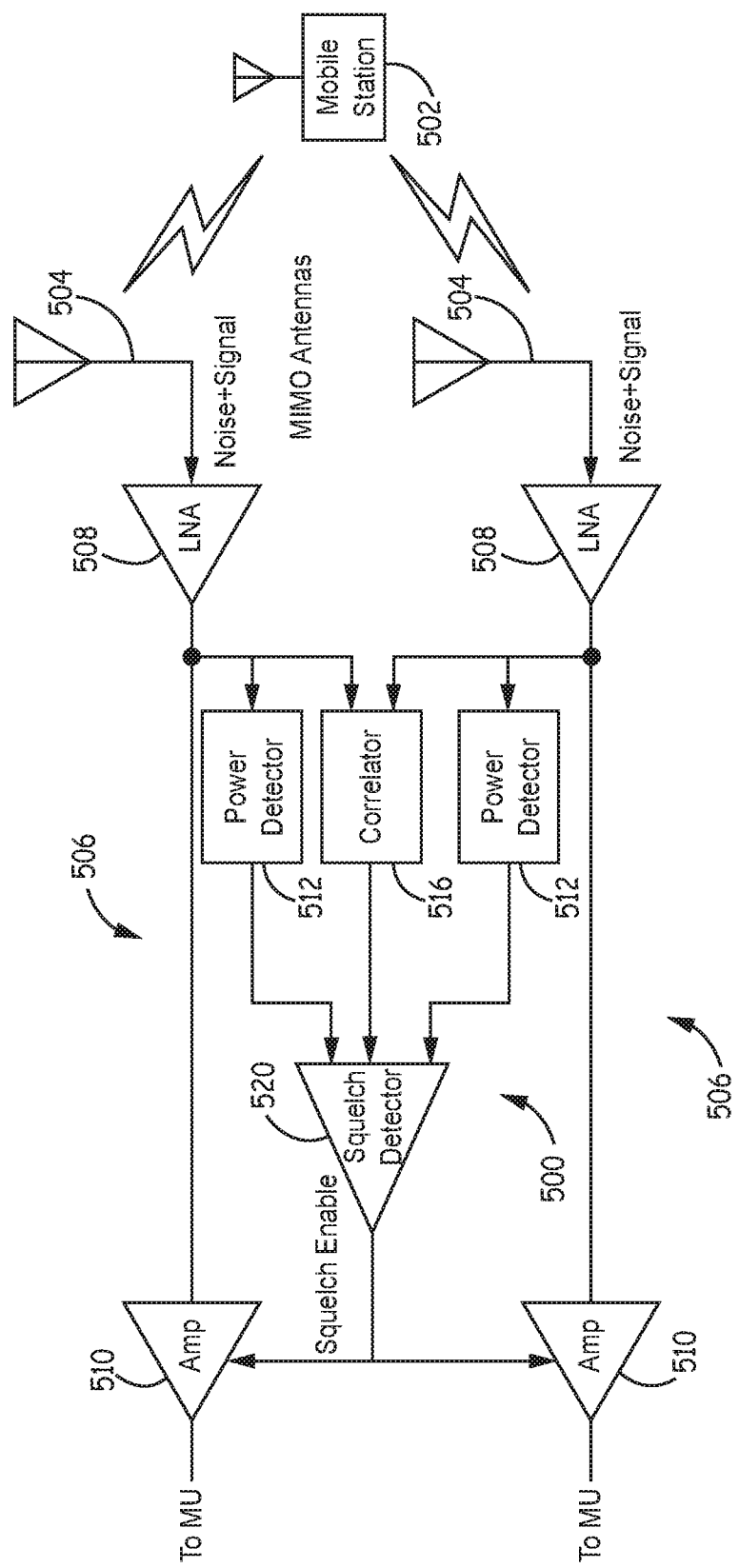
FIG. 5 shows another example of a squelch sub-system according to one aspect.

FIG. 5 shows another example of a squelch sub-system 500 according to one aspect. In FIG. 5, two antennas 504 are used to receive a signal from a mobile station 502. Although two antennas 504 are shown, more than two antennas may be used. Each antenna 504 can receive the same signals. Each antenna 504 is communicatively coupled to a signal path 506 that includes a low-noise amplifier 508, a power detector 512 and a variable gain device 510. The squelch sub-system 500 includes a correlator 516 and a squelch detector 520. The squelch detector 520 may be implemented using one or more suitable devices for comparing signal values (or other input data). In some aspects, the squelch detector 520 may be a comparator. The gain of the variable gain devices 510 is communicatively coupled to and controlled by the output of the squelch sub-system 500. The input of the correlator 516 is communicatively coupled to each signal path 506 and the output the correlator signal is communicatively coupled to the squelch detector 520. The input of the squelch detector 520 is communicatively coupled to the output of the correlator 516 and the output of the power detector 512 in each signal path 506. The squelch detector 520 may compare the output of the correlator 516 and the power detectors 512 to a threshold power level to determine whether or not to activate a squelch (e.g., set the variable gain device 510 in each signal path 506 to zero vs. allow the amplifier 510 in each signal path 506 to operate in its normal state). If a signal in one or both of the signal paths 506 has a signal power above the noise threshold, the signal power level may indicate the presence of a mobile signal in at least one of the signal paths 506. The squelch sub-system 500 may not be activated (e.g., the variable gain device 510 may be set to a gain value that does not mute or otherwise attenuate the uplink signal) without regard to the output of the correlator 516.

Figure 6:
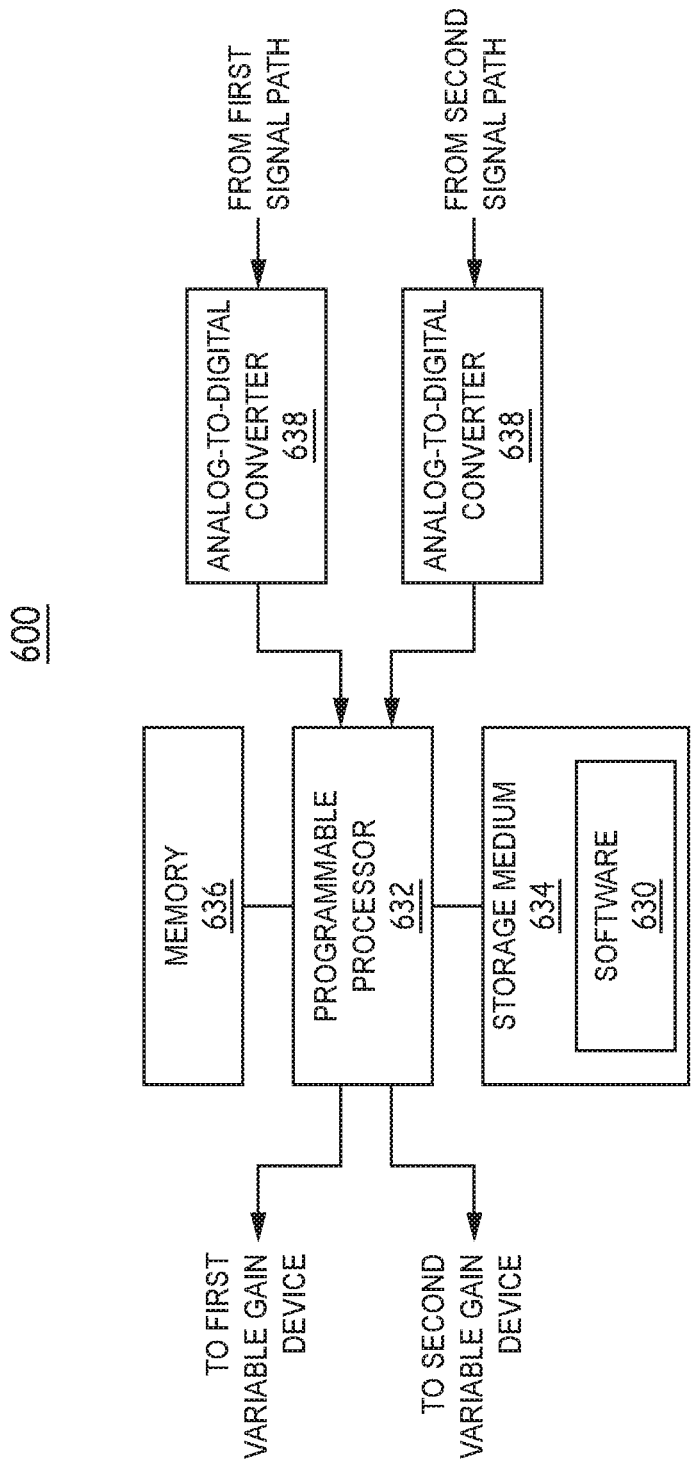
FIG. 6 illustrates one example of a squelch sub-system that is implemented, at least in part, in software executing on one or more programmable processors.

As noted above, the various squelch circuits and sub-systems described here can be implemented in various ways. For example, FIG. 6 illustrates one example of a squelch sub-system 600 that is implemented, at least in part, in software 630 executing on one or more programmable processors 632 (for example, using digital signal processing techniques). The software 630 and programmable processors 632 can be implemented in a single node of a DAS or across multiple nodes of a DAS (for example, in one or more of a master unit, an intermediary unit, and one or more remote units).

The software 630 comprises program instructions that are stored (or otherwise embodied) on or in an appropriate non-transitory storage medium or media 634 (such as flash or other non-volatile memory, magnetic disc drives, and/or optical disc drives) from which at least a portion of the program instructions are read by the programmable processor 632 for execution thereby. Although the storage medium 634 is shown in FIG. 6 as being included with the programmable processor 632, it is to be understood that remote storage media (for example, storage media that is accessible over a network) and/or removable media can also be used. In the example shown in FIG. 6, memory 636 is provided for storing the program instructions (and any related data) during execution by the programmable processor 632. Memory 636 can comprise, for example, any suitable form of random access memory (RAM) now known or later developed, such as dynamic random access memory (DRAM). In other embodiments, other types of memory are used.

In the example shown in FIG. 6, where digital signal processing techniques are used, each uplink signal received via one or more antennas (and, for example, output by a relevant low-noise amplifier) is digitized using one or more analog-to-digital converters 638 and processed by the software 630 executing on the processor 632 using digital signal processing techniques in order to implement at least some of the squelch circuits and sub-systems described above. The sub-system 600 can also include other conventional digital signal processing functions or devices (such one or more digital down-converters, filters, etc.). In the example shown in FIG. 6, the analog-to-digital converters 638 are shown as being separate from the processor 632. However, it is to be understood that the analog-to-digital converters 638 can be integrated with or into the processor 632.

Each squelch circuit or sub-system (or portions thereof) can be implemented in other ways (for example, using one or more field programmable gate arrays (FPGAs), one or more application specific integrated circuits (ASICs), etc.). Each squelch circuit or sub-system (or portions thereof) can be implemented in yet other ways.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A system comprising:
   a first signal path configured to receive a first uplink signal and a second signal path configured to receive a second uplink signal;
   a correlator communicatively coupled to the first signal path and the second signal path and configured to configured to produce respective correlation data indicative of any of correlation between the respective first uplink signal and the respective second uplink signal, wherein the correlator is configured to determine that the first uplink signal is uncorrelated with the second uplink signal by performing a correlation function on a number of samples obtained from each of the first uplink signal and the second uplink signal, the number of samples being set by a correlation window; and
   a comparator communicatively coupled to the correlator and configured to cause, based on receiving the correlation data, a first variable gain device in the first signal path to adjust a gain of the first uplink signal and a second variable gain device in the second signal path to adjust a gain of the second uplink signal.

2. The system of claim 1, wherein the correlator is configured to produce correlation data indicative of at least one of:
   an absence of a correlation between the first uplink signal and the second uplink signal;
   a presence of a correlation between the first uplink signal and the second uplink signal; and
   a degree of a correlation between the first uplink signal and the second uplink signal.

3. The system of claim 1, wherein the first variable gain device in the first signal path adjusts the gain of the first uplink signal by at least one of: amplifying the first uplink signal and attenuating the first uplink signal; and
   wherein the second variable gain device in the second signal path adjusts the gain of the second uplink signal by at least one of: amplifying the second uplink signal and attenuating the second uplink signal.

4. The system of claim 1, wherein the number of samples for the correlation window is adjustable.

5. The system of claim 1, wherein at least one of the correlator and the comparator are implemented in software executing on a programmable processor.

6. The system of claim 1, wherein the system comprising a distributed antenna system (DAS).

7. The system of claim 1, wherein the system is configured to set a first gain value for the first variable gain device to zero in order to adjust the gain of the first uplink signal by muting the first uplink signal and set a second gain value for the second variable gain device to zero in order to adjust the gain of the second uplink signal by muting the second uplink signal.

8. The system of claim 1, wherein the system is configured to set a first gain value for the first variable gain device to a non-zero value below a standard value in order to attenuate the first uplink signal and set a second gain value for the second variable gain device to a non-zero value below the standard value in order to attenuate the second uplink signal.

9. The system of claim 1, wherein the system is configured to cause, based at least in part on the correlation data, the first variable gain device in the first signal path to not adjust the gain of the first uplink signal and the second variable gain device in the second signal path to not adjust the gain of the second uplink signal when the correlation data is indicative of a correlation between the first uplink signal and the second uplink signal.

10. A system comprising:
a first signal path configured to receive a first uplink signal and a second signal path configured to receive a second uplink signal;
a correlator communicatively coupled to the first signal path and the second signal path and configured to configured to produce respective correlation data indicative of any of correlation between the respective first uplink signal and the respective second uplink signal;
a comparator communicatively coupled to the correlator and configured to cause, based on receiving the correlation data, a first variable gain device in the first signal path to adjust a gain of the first uplink signal and a second variable gain device in the second signal path to adjust a gain of the second uplink signal;
a first power detector communicatively coupled to the first signal path and configured to output a first detected power level for the first uplink signal to the comparator; and
a second power detector communicatively coupled to the second signal path and configured to output a second detected power level for the second uplink signal to the comparator;
wherein the comparator is further configured to cause the first variable gain device to adjust the gain of the first uplink signal and the second variable gain device to adjust the gain of the second uplink signal based on the first detected power level and the second detected power level being below a threshold power level.

11. The system of claim 10, wherein the first signal path is configured to receive a first additional uplink signal and a second signal path configured to receive a second additional uplink signal;
wherein the first power detector is configured to output a first additional detected power level for the first additional uplink signal to the comparator and to output a second additional detected power level for the second additional uplink signal to the comparator;
wherein the comparator is further configured to configure, based on one or more of the first additional detected power level and the additional second detected power level being above a threshold power level, one or more of the first variable gain device and the second variable gain device with a gain value such that one or more of the first additional uplink signal and the second additional uplink signal are provided to a combiner module that is communicatively coupled to the first signal path and the second signal path.

12. A method comprising:
receiving a first uplink signal in a first signal path;
receiving a second uplink signal in a second signal path;
producing correlation data indicative of any correlation between the first uplink signal and the second uplink signal;
determining that the first uplink signal is uncorrelated with the second uplink signal by performing a correlation function on a number of samples obtained from each of the first uplink signal and the second uplink signal, the number of samples being set by a correlation window, and
causing, based at least in part on the correlation data, a first variable gain device in the first signal path to adjust a gain of the first uplink signal and a second variable gain device in the second signal path to adjust a gain of the second uplink signal.

13. The method of claim 12, wherein producing correlation data indicative of any correlation between the first uplink signal and the second uplink signal comprises:
producing correlation data indicative of at least one of:
an absence of a correlation between the first uplink signal and the second uplink signal;
a presence of a correlation between the first uplink signal and the second uplink signal; and
a degree of a correlation between the first uplink signal and the second uplink signal.

14. The method of claim 12, wherein the first variable gain device in the first signal path adjusts the gain of the first uplink signal by at least one of: amplifying the first uplink signal and attenuating the first uplink signal; and
wherein the second variable gain device in the second signal path adjusts the gain of the second uplink signal by at least one of: amplifying the second uplink signal and attenuating the second uplink signal.

15. The method of claim 12, further comprising:
detecting a first detected power level for the first uplink signal;
detecting a second detected power level for the second uplink signal; and
causing the first variable gain device to adjust the gain of the first uplink signal and the second variable gain device to adjust the gain of the second uplink signal based on the first detected power level and the second detected power level being below a threshold power level.

16. The method of claim 15, further comprising:
receiving a first additional uplink signal in the first signal path;
receiving a second additional uplink signal in the second signal path;
detecting a first additional detected power level for the first additional uplink signal;
detecting a second additional detected power level for the second additional uplink signal; and
configuring, based on one or more of the first additional detected power level and the second additional detected power level being above a threshold power level, one or more of the first variable gain device and the second variable gain device with a gain value such that one or more of the first additional uplink signal and the second additional uplink signal are provided to a combiner module that is communicatively coupled to the first signal path and the second signal path.

17. The method of claim 12, wherein the number of samples for the correlation window is adjustable.

18. The method of claim 12, wherein at least a portion of the method is implemented in software executing on a programmable processor.

19. The method of claim 12, wherein the method is performed in a distributed antenna system (DAS).

20. The method of claim 12, wherein causing, based at least in part on the correlation data, the first variable gain device in the first signal path to adjust the gain of the first uplink signal and the second variable gain device in the second signal path to adjust the gain of the second uplink signal comprises:
setting a first gain value for the first variable gain device to zero in order to attenuate the first uplink signal by muting the first uplink signal and setting a second gain value for the second variable gain device to zero in order to attenuate the second uplink signal by muting the second uplink signal.

21. The method of claim 12, wherein causing, based at least in part on the correlation data, the first variable gain device in the first signal path to adjust the gain of the first uplink signal and the second variable gain device in the second signal path to adjust the gain of the second uplink signal comprises:
setting a first gain value for the first variable gain device to a non-zero value below a standard value in order to attenuate the first uplink signal and setting a second gain value for the second variable gain device to a non-zero value below the standard value in order to attenuate the second uplink signal.

22. The method of claim 12, further comprising:
causing, based at least in part on the correlation data, the first variable gain device in the first signal path to not adjust the gain of the first uplink signal and the second variable gain device in the second signal path to not adjust the gain of the second uplink signal when the correlation data is indicative of a correlation between the first uplink signal and the second uplink signal.

23. A distributed antenna system comprising:
at least one master unit; and
a plurality of remote units, each of the plurality of remote units associated with a respective one or more antennas;
wherein each of the remote units is communicatively coupled to the master unit;
wherein the distributed antenna system comprises, for each remote unit:
a respective first signal path configured to receive a respective first uplink signal;
a respective second signal path configured to receive a respective second uplink signal;
a respective correlator communicatively coupled to the respective first signal path and the respective second signal path and configured to produce respective correlation data indicative of any of correlation between the respective first uplink signal and the respective second uplink signal, wherein the correlator is configured to determine that the first uplink signal is uncorrelated with the second uplink signal by performing a correlation function on a number of samples obtained from each of the first uplink signal and the second uplink signal, the number of samples being set by a correlation window; and
a respective comparator communicatively coupled to the respective correlator and configured to cause, based on receiving the respective correlation data, a respective first variable gain device in the respective first signal path to adjust a gain of the respective first uplink signal and a respective second variable gain device in the respective second signal path to adjust a gain of the respective second uplink signal.

24. The distributed antenna system of claim 23, wherein the first uplink signals and the second uplink signals are provided to the master unit; and
wherein the master unit is configured to combine the first uplink signals and the second uplink signals provided to the master unit from at least some of the remote units.

25. The distributed antenna system of claim 23, further comprising: at least one intermediary device that communicatively couples at least one remote unit to the master unit.

* * * * *